United States Patent
Biggs

(10) Patent No.: US 7,190,302 B2
(45) Date of Patent: Mar. 13, 2007

(54) SUB-SURFACE RADAR IMAGING

(75) Inventor: Roger Tredegar Biggs, Kent (GB)

(73) Assignee: The Secretary of State for Defence in Her Britannic Majesty's Government of the United Kingdom of Great Britain and Northern Ireland, Salisbury (GB)

( * ) Notice: Subject to any disclaimer, the term of this patent is extended or adjusted under 35 U.S.C. 154(b) by 264 days.

(21) Appl. No.: 10/491,237

(22) PCT Filed: Sep. 13, 2002

(86) PCT No.: PCT/GB02/04181

§ 371 (c)(1),
(2), (4) Date: Mar. 29, 2004

(87) PCT Pub. No.: WO03/025613

PCT Pub. Date: Mar. 27, 2003

(65) Prior Publication Data

US 2005/0062639 A1 Mar. 24, 2005

(30) Foreign Application Priority Data

Sep. 15, 2001 (GB) ................................. 0122357.7

(51) Int. Cl.
*G01S 13/88* (2006.01)
*G01S 13/90* (2006.01)
*G01V 3/12* (2006.01)

(52) U.S. Cl. ..................... 342/22; 342/25 A; 342/179; 342/194; 342/188

(58) Field of Classification Search ................. 342/22, 342/25 R, 25 A–25 F, 179, 180, 90, 188–192, 342/194–197
See application file for complete search history.

(56) References Cited

U.S. PATENT DOCUMENTS 3,435,570 A 4/1969 Berry et al.

(Continued)

FOREIGN PATENT DOCUMENTS

DE 3327808 2/1985

(Continued)

OTHER PUBLICATIONS

"Mine detection with a multi-channel stepped-frequency ground—penetrating radar", Bradley-M, et al, Proceedings of the SPIE—The International Society for Optical Engineering, 1999, vol. 3710, p. 953-960.*

"Mine detection with ground penetrating synthetic aperture radar", Bradley-M-R, et al, Proceedings of the SPIE—The International Society for Optical Engineering, 2002, vol. 4742, p. 248-258.*

(Continued)

*Primary Examiner*—John B. Sotomayor
(74) *Attorney, Agent, or Firm*—Dean W. Russell; Kilpatrick Stockton LLP

(57) ABSTRACT

Detailed is radar imaging apparatus including a single transmit antenna and at least one receive antenna, scanning apparatus (e.g. a pantograph) for mechanically scanning the antennas over a surface of interest, position providing apparatus (e.g. a computer driving the pantograph via an X-Y drive and a stepper motor) providing a position signal indicative of the instantaneous position of the transceiver and a control system for operating the transmit antenna in a stepped frequency continuous wave mode. The amplitude and phase components of the receive antenna signal are analysed and the output combined with the position signal as in a synthetic aperture array to provide a radar image signal of the surface and underlying features. The scan is two-dimensional (random or boustrophedral).

36 Claims, 3 Drawing Sheets

U.S. PATENT DOCUMENTS

| | | | |
|---|---|---|---|
| 4,800,387 A * | 1/1989 | Joy .................... 342/165 |
| 4,831,383 A * | 5/1989 | Ohnishi et al. .......... 342/22 |
| 4,839,654 A * | 6/1989 | Ito et al. ................ 342/22 |
| 4,937,580 A | 6/1990 | Wills |
| 5,327,139 A | 7/1994 | Johnson |
| 5,339,080 A * | 8/1994 | Steinway et al. ........ 342/22 |
| 5,357,253 A | 10/1994 | Van Etten et al. |
| 5,673,050 A * | 9/1997 | Moussally et al. ....... 342/22 |
| 5,835,054 A | 11/1998 | Warhus et al. |
| 5,900,833 A * | 5/1999 | Sunlin et al. ............ 342/22 |
| 6,130,641 A * | 10/2000 | Kraeutner et al. ....... 342/179 |
| 6,445,334 B1 * | 9/2002 | Bradley et al. .......... 342/22 |
| 6,621,448 B1 * | 9/2003 | Lasky et al. ............ 342/22 |
| 6,657,577 B1 * | 12/2003 | Gregersen et al. ....... 342/22 |
| 6,750,809 B1 * | 6/2004 | Cho et al. ............... 342/129 |
| 2002/0044078 A1 * | 4/2002 | Liedtke et al. ........... 342/22 |
| 2002/0122000 A1 * | 9/2002 | Bradley et al. .......... 342/22 |
| 2002/0152624 A1 | 10/2002 | Asanuma |
| 2004/0118313 A1 * | 6/2004 | Temes et al. ........... 102/498 |
| 2004/0232329 A1 * | 11/2004 | Biggs ................... 250/306 |
| 2005/0062639 A1 * | 3/2005 | Biggs ................... 342/22 |

FOREIGN PATENT DOCUMENTS

| | | |
|---|---|---|
| DE | 3804445 A1 * | 8/1989 |
| DE | 19913222 A1 * | 10/2000 |
| EP | 0288578 | 5/1988 |
| GB | 2053516 | 2/1981 |
| GB | 2336262 | 11/1997 |
| JP | 60027203 A * | 2/1985 |
| JP | 07159169 A * | 6/1995 |
| JP | 11142513 A * | 5/1999 |
| WO | WO 98/10310 | 3/1998 |
| WO | WO 98/58275 | 12/1998 |
| WO | WO 01/55673 | 8/2001 |

OTHER PUBLICATIONS

H. Sorensen, et al., "Identification of Mine-Shaped Objects based on an Efficient Phase Stepped-Frequency Radar Approach," Image Processing, 1997, pp. 142-145.

* cited by examiner

SUB-SURFACE RADAR IMAGING

CROSS REFERENCE TO RELATED APPLICATIONS

This application is the U.S. national phase of International Application No. PCT/GB02/04181 filed on Sep. 13, 2002 and published in English as International Publication No. WO 03/025613 A2 on Mar. 27, 2003, which application claims priority to Great Britain Application No. 0122357.7 filed on Sep. 15, 2001, the contents of which are incorporated by reference herein.

The present invention relates to imaging of features lying below a surface such as a wall using radar techniques.

While radar was originally developed for the detection and tracking of remote objects from a base station which may be stationary, as in a flight control centre, or moving, as in a ship, aircraft or other vehicle, it has found other uses, and among these is the imaging of surface and sub-surface features in a variety of applications.

One such application is the investigation of ground features. Thus U.S. Pat. No. 5,325,095 (Vadnais) refers to prior art using an airborne platform and describes a ground penetrating radar (GPR) system useful for detecting buried objects such as mineral deposits, underground rivers and caverns, and underground artefacts such as buried ordnance, waste, storage tanks, pipes, sewers, cables, etc. Phase quadrature signals are transmitted, and the received signals are demodulated to provide a DC signal for digitisation and conversion into the frequency domain by a fast Fourier transform. The resulting signal provides information about the range and cross-section of a target.

Another ground penetrating bistatic radar system for similar purposes is described in U.S. Pat. No. 5,499,029 (Bashforth), the value and magnitude of a preponderant frequency in the resulting signal being indicative of target range and signature.

Both of these disclosures show a single transmit and a single receive antenna (a bistatic radar system), and neither refer specifically to the scanning of the radar apparatus over an area larger than the instantaneous coverage.

However, where the surface is relatively extensive, the radar apparatus can be effectively scanned over the surface, for example by being mounted in a vehicle or aircraft. In such a case it is necessary to know, or to be able to derive, the position of the radar apparatus for correlation with the radar signal, in order to be able to derive a map of the entire area. For example, U.S. Pat. No. 5,673,050 (Moussally) describes a 3-dimensional radar imaging system for the detection and mapping of underground objects and voids, in which a single transmit/receive antenna is operated from a moving vehicle such as a helicopter, and the radar signals are combined with position signals from a GPS or inertial navigation system in a synthetic aperture radar (SAR) technique. Moussally employs an interrupted frequency modulated continuous wave signal where the transmitted signal changes frequency continuously, whereas the first aspect of the present invention employs a stepped frequency continuous wave providing a quasi-static system.

Similarly, U.S. Pat. No. 5,796,363 (Mast) discloses a SAR system in which position is derived by triangulation from signals from three reference radar time-of-flight measurement units, and provides the facility to look at structures comprised of layers of dissimilar materials that effect the radar pulse propagation velocity differently, one example being asphalt over concrete and rebar. This uses a single transmit antenna and a single receive antenna.

International Patent Application No. WO 98/58275 (Forsvarets) relates to a monostatic pulsed mode radar for imaging at relatively long range.

Surface penetrating radar imaging systems may be implemented with relatively long wavelength radiation. The latter feature enables the surface to be efficiently irradiated using a remote transceiver, but the resolution is relatively low. The use of shorter wavelength radiation is not so practical or efficient using remote irradiation, due to relatively rapid attenuation of the signal. Thus, where the surface to be investigated and/or the features to be detected may be of a relatively small scale, techniques where the radar antennae are relatively remote may not be appropriate.

U.S. Pat. No. 5,030,956 (Murphy) discloses a radar tomography system for medical imaging in which the antenna is associated with a standard dental X-ray cone 0.5 metres long.

U.S. Pat. No. 5,835,053 (Davis) shows a roadway ground penetrating system to provide measures of the depth and thickness of pavement structure layers, having top and bottom interfaces. The radar apparatus is mounted in a towed trailer and includes an array of at least two receive antennae differently spaced from a transmit antenna. The timings of the signals reflected from the interfaces are combined with the known receive antennae spacing to provide a measure of signal velocity, from which can be derived layer depths and thicknesses. SAR is not mentioned.

U.S. Pat. No. 5,835,054 (Warhus) also discloses a system having radar apparatus including a receive/transmit antenna array mounted to a truck, e.g. on the bumper. In this case, the radar return amplitude and time signal information is combined with X-Y co-ordinate position information to provide 1, 2 or 3 dimensional imaging information. Radar phase information is not obtained or used, and the radar is a pulsed system, not a continuous wave system.

U.S. Pat. No. 5,357,253 (Van Etten) discloses an earth probing system using a tuned transmit antenna for operating at a relatively low frequency. The latter requires switching circuitry whereas in embodiments of the present invention untuned wideband transmit and receive antennas are employed. The radar is operated in the frequency domain, but SAR processing and coherent integration of data are not mentioned.

U.S. Pat. No. 5,900,833 and International Patent Application No. 97/41449 (both Sunlin) also disclose the use of a moving array of transmitting and receiving antennae which is moved, for example on a tank or helicopter, for use in a SAR material penetrating imaging system. It is said to be suitable for detecting small objects close to a surface by using very narrow pulses, and also for the detection of large deep objects by using wider pulses. Phase information is not obtained or used.

European Patent Application No. 0 744 629 (Hughes Missiles) discloses an imaging radar for providing images of objects behind obscuring structures such as concrete and stucco barriers and walls, or within buildings. This uses a transmit antenna and an array or receive antennae, and operates on time and amplitude of reflected signals. No mention is made of the use of phase information, or of the implementation of SAR techniques.

U.S. Pat. No. 5,969,661 (Benjamin) uses a phased array of transmitting antennae for irradiating a selected voxel within a search volume. The use of focussing is also the subject of an article "Synthetically-Focussed Surface-Penetrating Radar for Operation From a Moving Vehicle", R Benjamin et al, $2^{nd}$ EUREL International Conference on the Detection of Abandoned Lancimines, Edinburgh, October 1998.

The EG&G Silverrod imaging system employs a 2 to 6 GHz stepped frequency radar in which a 60 cm. square area is scanned to produce maps of 16 depth planes. Bistatic log-periodic antennae are mounted side by side and moved over the area in any manner, with X-Y co-ordinates being derived from an ultrasonic time of arrival location system.

The present invention facilitates the implementation of a high resolution short range radar imaging method in which a radar transceiver is moved over a surface in relatively close proximity thereto, for providing images of features lying in or under the surface. In the range of frequencies appropriate for sub-surface imaging of this type, normally in the range 1 to 20 GHz, it is necessary to use a transceiver located relatively close to the surface, and preferably within 2 or 3 wavelengths of the surface for efficient operation.

The surface to be scanned may be a wall or other vertical surface. However, it may also be any other surface such as the ground or a ground feature such as a road or pavement, or a roof of a building.

The apparatus provided by the present invention may be useful in a number of areas of interest, including the detection of unexploded ordnance or other explosive devices, for example in demining an area of ground; in ground clearance where it is necessary to be able to detect the presence of, for example, dumped materials and hazardous waste; in transport, for example for assessing roads and runways; and in civil engineering, for example in bridge and building testing, looking for erosion in structures, as in building bars; and for the internal examination of containers such as suitcases.

In a first aspect the present invention provides radar apparatus comprising a transceiver including a single transmit antenna and at least one receive antenna, scanning means for mechanically scanning said transceiver over a surface of interest, position providing means providing a position signal indicative of the instantaneous position of the transceiver, control means for operating the transmit antenna in a stepped frequency continuous wave mode, signal analysing means for analysing amplitude and phase components of the receive antenna signal, and signal combining means for combining the output of said signal analysing means with said position signal as in a synthetic aperture array (SAR) to provide a radar image signal of the surface and underlying features. The first aspect extends to a related method of imaging sub-surface features.

The stepped frequency continuous wave mode is a process in which a CW signal is transmitted and received for a period prior to incrementing the frequency, and repeating the process a number of times. In the embodiment the frequency steps are obtained by the use of a staircase voltage generator coupled to a voltage controlled oscillator. Employment of this mode as opposed to impulse radar permits a wide bandwidth to be used with relatively simple hardware, and avoids any requirement for fast accurate sampling circuits. It is preferred that the frequency range used be as wide as possible, since in general this increases the available resolution of the image. Thus in use of the invention the bandwidth of the radar frequencies employed is preferably at least 8 GHz (for example in the range 8 to 16 GHz), more preferably at least 15 GHz (for example in the range 5 to 20 GHz), and even more preferably at least 20 GHz (for example in the range 1 to 20 GHz). The bandwidth is preferably centred within the range 8 to 16 GHz, more preferably within the range 9 to 14 GHz, and even more preferably within the range 10 to 13 GHz (as exemplified in the ranges above the centre frequencies are 12, 12.5 and 11.5 GHz respectively).

In the first aspect, the invention enables the provision of a SAR sub-surface image of (for example) a wall with improved resolution and faster scanning than prior art systems.

At frequencies in the 1 to 20 GHz range, the time difference between the radiated and return signals is so short that it is difficult to provide gating which is sufficiently fast to enable separation of the two signals if a monostatic transceiver (single antenna acting for both signals) is provided. Hence the present invention uses at least one separate receive antenna (bistatic arrangement). In a preferred embodiment, a single receive antenna is provided. An advantage of the bistatic arrangement is that it permits imaging at both short and long ranges. The provision of one or more receivers enables both the aligned and orthogonal polarisations to be exploited in the signal processing (c.f. the arrangement in Moussally, which uses a single linearly polarised antenna exploiting the Brewster angle).

Furthermore, at these frequencies, sampling of the return signal is particularly difficult (at up to 40 GHz) when a pulsed system is used—the rise and fall times of sampling pulses for use in such systems would normally be measured in picoseconds. Therefore, the apparatus of the present invention is preferably arranged to be used in a continuous wave mode, which eases the sampling requirements significantly.

The phase and amplitude information may be embodied in I and Q signals (in-phase and quadrature signals), e.g. from mixing the receive antenna signal with a reference signal. These signals may be further processed to provide the amplitude information as separate phase quadrature amplitude signals I, Q as a function of time (i.e. real and imaginary time domain data), for example by use of an inverse fast Fourier transform circuit (hence the use of different frequencies in the stepped continuous wave mode, which may be regarded as facilitating the depth resolution, returns from the same feature having different phase and amplitudes depending on the frequency).

The signal combining means includes means for performing the SAR function in known manner. If position of the transceiver and a voxel is specified, the distance and hence time delay of the signal may be calculated. On the basis of this delay) the I and Q signal amplitudes at the corresponding delay may be extracted from the I and Q time domain data for that voxel, and by suitably combining (coherently adding) such information from receive antenna signals for antenna positions over the whole scanned area, pairs of voxel I and Q signal amplitudes may be derived for each and every voxel of the imaged volume associated with the scanned surface (a voxel being an elementary unit volume of an array constituting the imaged volume).

For each voxel, the signal combining means may be arranged to determine the square root of the sum of the squares of the I and Q components of the voxel I and Q signal amplitudes to provide a voxel total amplitude signal. The array of voxel total amplitude signal provides said radar image signal, which may then be displayed.

The array of voxels thus provided is relatively coarse, so giving rise to an image of relatively low resolution. Thus it is preferred, as in the embodiment, for the signal combining means to be arranged to interpolate the voxel I and Q signal amplitudes for all the voxels are over a finer resolution array of voxels, each voxel of said finer array thereby having separate interpolated quadrature signal amplitudes, prior to the squaring and adding step, i.e. the latter is preferably performed on interpolated voxel quadrature signal amplitudes to provide voxel total amplitude signals for a finer array.

The scanning means enables the scanning of the surface of interest with multiple passes, as in boustrophedral scanning for example. Thus the scanning means enables a 2-dimensional scan of the surface, ensuring uniform illumination in both dimensions, thereby giving better signal gain in the SAR processing with equal lateral resolution in both directions and better image quality. This is to be contrasted with much of the prior art listed albove which employs SAR techniques, but in a "spotlight mode" where data is collected after a single pass over the target.

The scanning means may comprise a pantograph on which the transceiver is mounted. As particularly described, the pantograph is operatively coupled to an X-Y scanner, which in turn is coupled to a computer via stepper motors for precise and accurate control. The computer may also act as the position providing means.

In a second aspect the invention provides radar apparatus for the investigation of sub-surface features, the apparatus comprising a radar transceiver mounted on a pantograph for scanning over a surface of interest, and also extends to a related method of scanning a radar transceiver.

In the second aspect, the invention enables the mechanical scanning of a radar transceiver over a surface such as a wall in close proximity thereto, for example for providing a sub-surface image of features therein. The use of a pantograph is advantageous in that the transceiver portion of the apparatus can be collapsed down to provide a compact portable apparatus. It also enables the scan position to be accurately controlled, e.g. to within around 1 mm in the embodiment to be described, while maintaining a relatively fast scanning motion.

As particularly described, the pantograph is driven by stepper motors controlling an X-Y scanning frame under the control of a computer which also provides a position signal for use in data processing. However, it would equally be possible to provide a position sensing arrangement on the transceiver, or that end of the pantograph for providing an independent position signal.

Particularly where the surfaces to be encountered are likely to be uneven, or where there is a possibility that the transceiver to surface spacing may alter, for example due to deformation of the pantograph under gravity or in a windy situation, maintaining means may be provided for maintaining the transceiver a predetermined distance away from the surface. For example, a wheel may be provided on the transceiver mounting, or on the pantograph in the vicinity of the transceiver for contacting the surface. Where the surface is a horizontal upward facing surface such as a floor, this may be all that is necessary with reliance being placed on gravity to maintain the wheel to surface contact. Where other effects come into play, biasing means may be provided, e.g. a spring, for biasing the wheel or other maintaining means into contact with the surface.

The apparatus according to the second aspect may frtther include position providing means for providing a position signal indicative of the instantaneous position of the transceiver relative to a reference point on the pantograph. This function may be effected by the aforesaid computer.

Means may be provided for combining output signals from the transceiver with the position signal to provide a synthetic aperture array signal, which may then be processed to develop an image signal, e.g. for display.

As in the first aspect the transceiver may be operated operating in the frequency range 1 to 20 GHz, preferably in a continuous wave mode, and more preferably in a stepped frequency mode.

The transceiver of the second aspect may comprise separate transmit and receive antennae, and preferably a single transmit antenna and/or a single receive antenna.

In a preferred embodiment according to either aspect, the number of arms of said pantograph is variable for altering the area of said surface which is scanned.

Further advantages and features of the invention may be derived from a consideration of the appended claims, to which the reader is referred, and also from a reading of the following more detailed description of an embodiment of the invention, made with reference to the accompanying drawings, in which:

Figure 1:
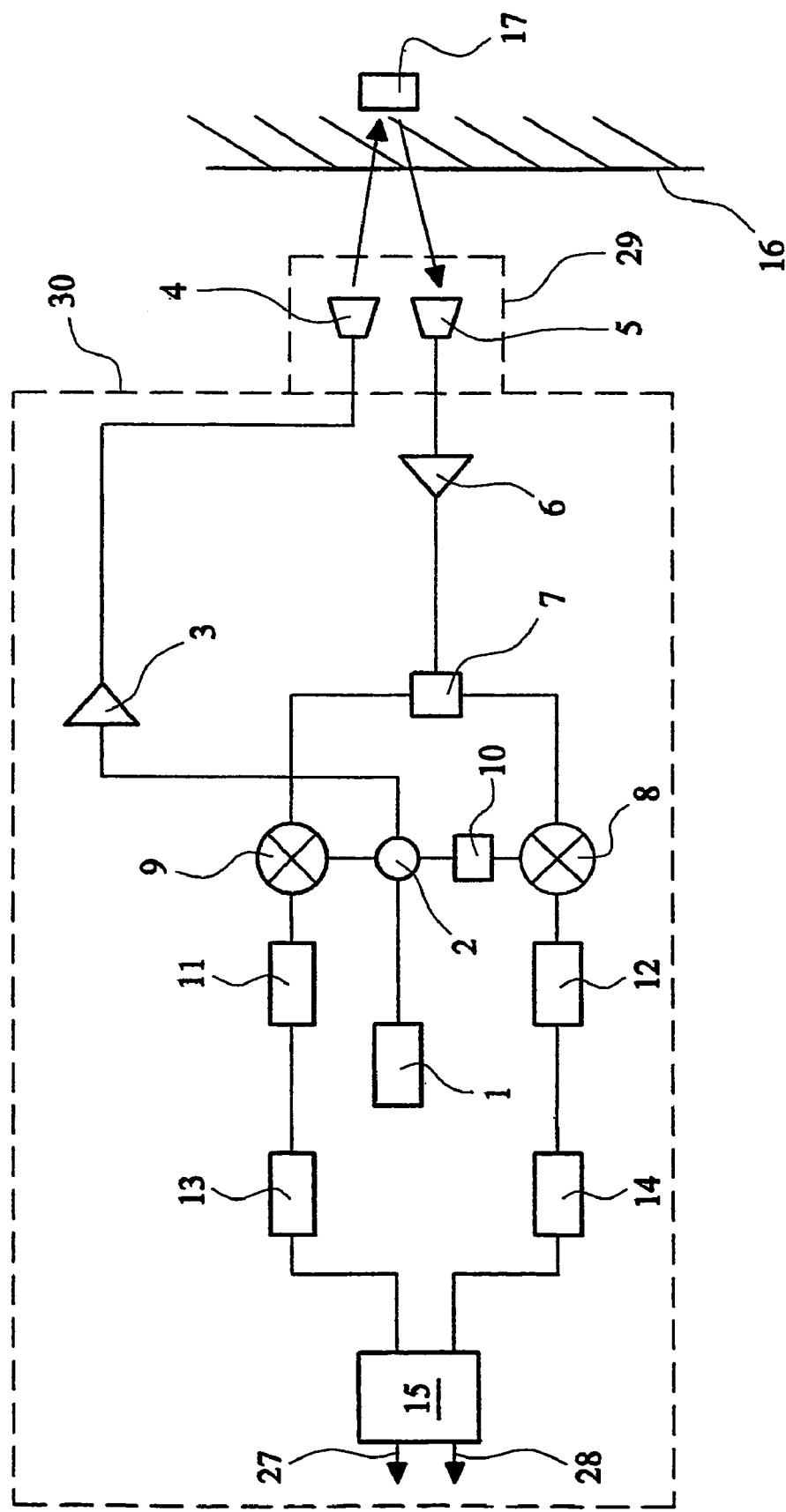
FIG. 1 is an outline schematic block diagram of a portion of an apparatus according to the invention, including stepped continuous wave processing circuitry and a transceiver portion.
Figure 3:
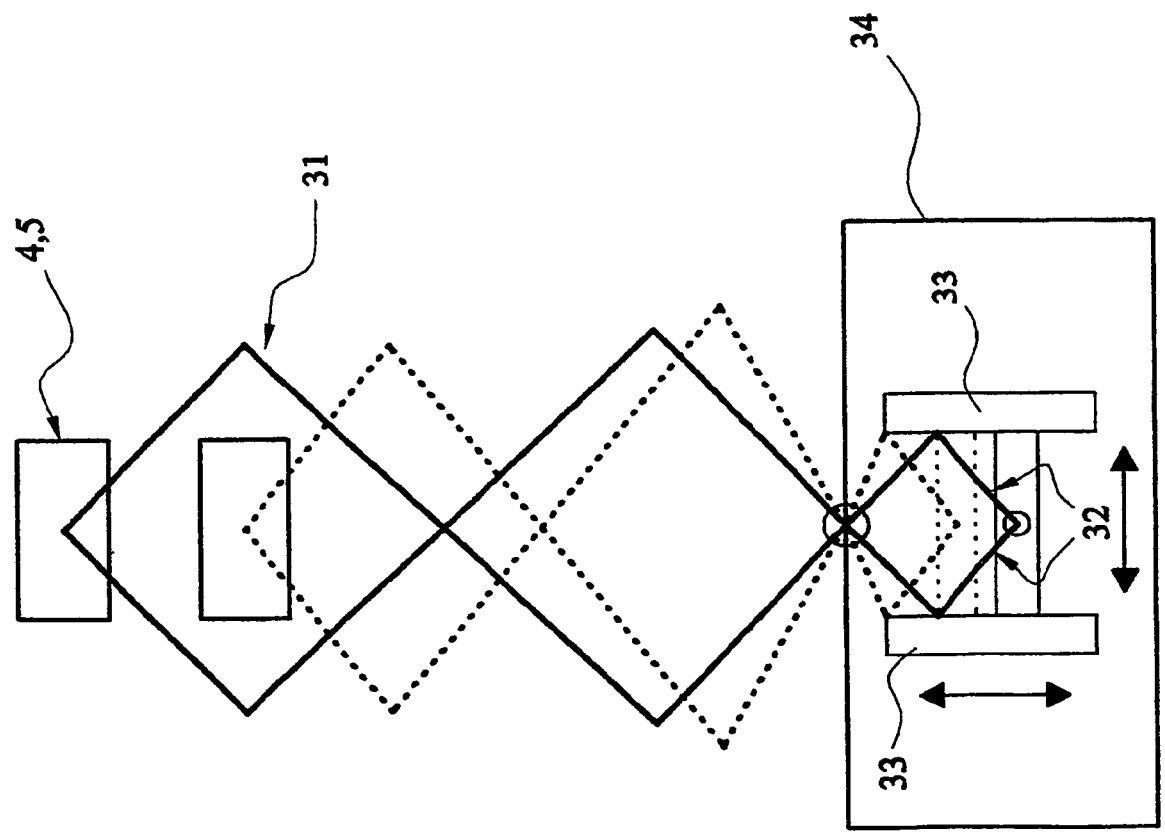
FIG. 3 shows in schematic form a transceiver positioning system useful for the apparatus of FIGS. 1 and 2.

FIG. 1 schematically shows a surface 16 of interest including a concealed object 17 for scanning by a transducer arrangement 29 coupled to stepped continuous wave processing circuitry 30. The transducer arrangement 29, which is shown in more detail in FIG. 3, includes horn antennae 4 and 5 which are fixed relative to each other and can be scanned over the surface 16.

The stepped continuous wave processing circuitry 30 includes a staircase voltage generator 1 controlling a frequency controlled oscillator (VCO) 2, which is coupled via an amplifier 3 for driving a single transmit radar antenna or horn 4. Returned radiation is received by one or more horn antennae 5, the output therefrom being fed via an amplifier 6 and a splitter 7 to RF mixers 8, 9. Mixer 9 receives a reference signal directly from the VCO 2 for in-phase demodulation, whereas mixer 8 receives the same signal via a 90° phase shifter 10 for quadrature demodulation. The outputs of mixers 8, 9 are coupled via respective low pass filters 11, 12 to respective sample and hold circuits 13, 14 capable of storing N values at any time. The values held in circuits 13, 14 are coupled to an N point inverse fast Fourier transfer (FFT) processor 15 providing real and imaginary data outputs 27, 28 for transmission to a synthetic aperture array (SAR) processing circuit shown in FIG. 2.

Figure 2:
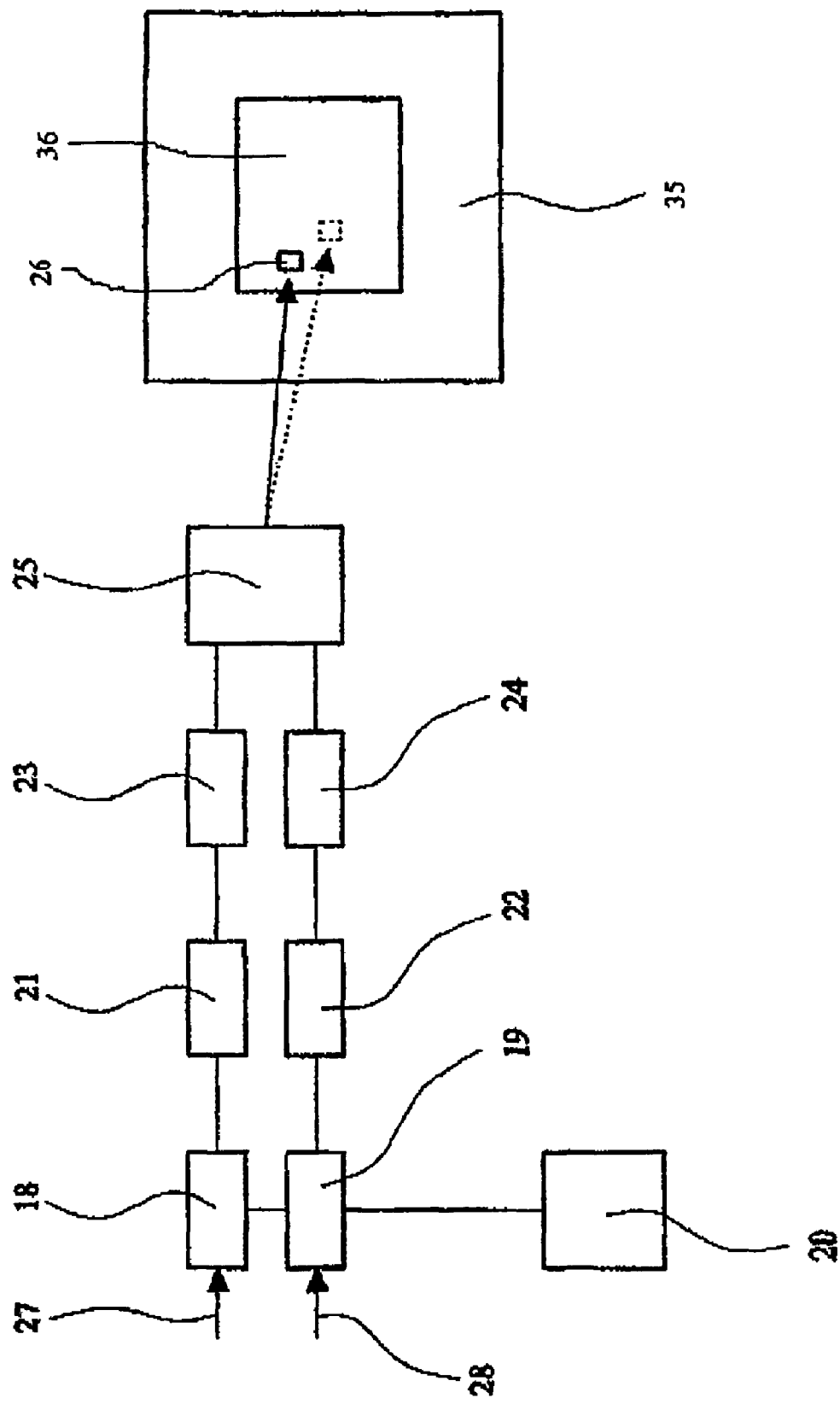
FIG. 2 is an outline schematic block diagram of an image signal processing portion of the apparatus according to the invention, complementary to the portion shown in FIG. 1.

As shown in FIG. 2, a circuit 20 coupled to a computer controlling the scanning of the antennae 4, 5 provides antenna position data X, Y, and also outputs 3-coordinate voxel position data, i.e. data P, Q, R defining an elementary volume in the volume being inspected by the apparatus. Respective circuits 18 and 19 receive the data 27, 28 where it is combined with the output of circuit 20 in a manner known per se. Preferably this step is accomplished by analysing the data 16, 17 for all values of P, Q, R before altering the values of X and Y. However, other known techniques for SAR analysis may be employed.

The outputs of the circuits 18, 19 are fed to respective circuits 21, 22 where they are integrated over all values of X and Y in respect of each voxel. The signals derived from the sampling process 13, 14 are relatively coarse, and if relied upon per se would result in relatively poor quality images. Hence it is preferred that circuits 21, 22 interpolate, the signals from circuits 18, 19, for example by a linear interpolation, prior to the integration process.

Up to this point the I and Q type signal have been processed separately. Subsequently, for each voxel the real output from the circuit 21 is squared at 23 and the imaginary output from the circuit 22 is squared at 24. At 25 the outputs of circuits 23 and 24 are added and the square root of the resulting sum is determined to provide a voxel value 26 which can then be displayed at a corresponding position, e.g. on a two-dimensional display 35 arranged to display one plane of voxels 36 at a time.

In use, the transducer arrangement 29 enables the horns 4, 5 to be mechanically scanned over a surface of interest such as a wall, road or pavement, and in close proximity thereto. As shown in more detail in FIG. 3, for this purpose the horns are mounted at or adjacent one end of a pantograph 31. The arms 32 at the other end of the pantograph 31 are secured to a pair of movable members 33 mechanically coupled to a computer controlled X-Y scanning frame 34 driven by stepper motors. The spacing of members 33 may be altered to control the extension of the pantograph and the position of the antennae 4, 5 in the Y direction, and the pair of members 33 may be moved laterally to control the position of the pantograph and antennae 4, 5 in the X direction.

In use, the transducer arrangement 29 enables the horns 4, 5 to be mechanically scanned over a surface of interest such as a wall, road or pavement, and in close proximity thereto. As shown in more detail in FIG. 3, for this purpose the horns are mounted at or adjacent one end of a pantograph 31. The arms 32 at the other end of the pantograph 31 are secured to a pair of movable members 33 mechanically coupled to a computer controlled X-Y scanning frame 34 driven by stepper motors. The spacing of members 33 may be altered to control the extension of the pantograph and the position of the antennae 4, 5 in the Y direction, and the pair of members 33 may be moved laterally to control the position of the pantograph and antennae 4, 5 in the X direction.

The sizing is such that an area of around 50 cm square may be scanned according to any desired pattern as determined by computer control. However, the coverage may be varied by altering the number of arms in the pantograph, or by providing an arrangement 29 with a different sizing.

In use, a preferred scanning pattern is boustrophedral, but any type of scan, including a random scan, could be used. If a low resolution image is initially acceptable, this could be generated from an initial relatively coarse scan, with additional information from further scanned locations in a refinement of the overall scan then being obtained to improve the image resolution.

Although the embodiment shows a single transmit antenna and a single receive antenna, it is possible to provide further transmit and/or receive antennae to increase the amount of data and to improve the signal to clutter ratio, particularly if polarisation effects are exploited. However, this may require modifications of the apparatus, for example the pantograph may need to be strengthened or otherwise adapted to support the additional weight, and unless a plurality of stepped frequency sources and receivers are provided, it will be necessary to provide switch multiplexers, which may be difficult at the preferred frequencies.

For example, if a linear polarisation transmitter is used, a single antenna could be used to receive the co-polarisation or cross-polarisation signal, or a pair of receive antennae may be provided for receiving both of these signals. Similarly if a transmit antenna emits circularly polarised radiation, a single antenna could be used to receive a signal of one linear polarisation, or a pair of receive antennae may be provided for receiving signals with orthogonally linear polarisations. In either case, the signal from the additional receive antenna generally facilitates and enhances detection and analysis of sub-surface anomalies. The transmit antenna may be capable of selectively emitting linear and circular polarised radiation.

The invention claimed is:

1. Radar imaging apparatus comprising a transceiver including a single transmit antenna and at least one separate receive antenna, control means for operating the transmit antenna in a stepped frequency continuous wave mode, scanning means for mechanically scanning said transceiver across a surface of interest, position providing means providing a position signal indicative of the instantaneous position of the transceiver, signal analysing means for analysing amplitude and phase components of the receive antenna signal, and signal combining means for combining the output of said signal analysing means with said position signal as in a synthetic aperture array to provide a radar image signal of the surface and underlying features, characterised in that (a) the apparatus is arranged for operation over a bandwidth of at least 8 GHz; and (b) part of the scanning means in use is located at a fixed position relative to said surface and the position providing means is arranged to provide a position signal as a function of the instantaneous position of the transceiver relative to the said fixed position.

2. Apparatus according to claim 1 wherein said scanning means is arranged for scanning over said surface in two dimensions.

3. Apparatus according to claim 1 wherein said scanning means comprises a scissor linkage.

4. Apparatus according to claim 3 wherein the number of arms of said scissor linkage is variable for altering the area of said surface which is scanned.

5. Apparatus according to claim 3 wherein said scissor linkage is coupled between an X-Y scanner and the transceiver.

6. Apparatus according to claim 5 wherein said X-Y scanner is coupled to a computer for control thereof.

7. Apparatus according to claim 6 wherein said computer is said position providing means.

8. Apparatus according to claim 1 wherein said signal analysing means is arranged to convert said receive antenna signal into separate phase quadrature amplitude signals I, Q.

9. Apparatus according to claim 8 wherein said signal analysing means is arranged to transform each of said signals I, Q into the time domain.

10. Apparatus according to claim 8 wherein said signal combining means is arranged to correlate separate said signals I, Q from the signal analysing means with voxel locations and said position signal for determining respective pairs of voxel I, Q signal amplitudes for each said voxel.

11. Apparatus according to claim 10 wherein for each voxel said signal combining means is arranged to determine the square root of the sum of the squares of the respective voxel I, Q signal amplitudes to provide a voxel total amplitude signal.

12. Apparatus according to claim 10 wherein said signal combining means is arranged to interpolate said voxel I, Q signal amplitudes for all the voxels over a finer resolution array of voxels, each voxel of said finer array thereby having separate interpolated I, Q signal amplitudes.

13. Apparatus according to claim 12 wherein for each voxel of said finer array said signal combining means is arranged to determine the square root of the sum of the squares of the respective interpolated voxel I, Q signal amplitudes to provide a voxel total amplitude signal.

14. Apparatus according to claim 11 wherein the array of voxel total amplitude signal provides said radar image signal.

15. Apparatus according to claim 1 and including means for displaying said radar image signal.

16. Apparatus according to claim 1 wherein said single transmit antenna is for transmitting a linear and/or circular polarisation signal.

17. Apparatus according to claim 1 comprising a single receive antenna for receiving a linear and/or circular polarisation signal.

18. Apparatus according to claim 1 comprising at least two receive antennae for receiving respective signals with different polarisations.

19. Apparatus according to claim 1 wherein said bandwidth is centred within the range 8 to 16 GHz.

20. A method of imaging sub-surface features comprising the steps of providing a transceiver including a single transmit radar antenna and at least one separate receive radar antenna, operating the transmit antenna in a stepped frequency continuous wave mode to irradiate a surface of interest, providing a scanner for mechanically scanning the transceiver across said surface, providing a position signal indicative of the instantaneous position of the transceiver relative to the stationary part of the scanning means, analysing the phase and amplitude of the receive antenna signal and combining the resulting information with said position signal as in a synthetic aperture array to provide a radar image signal of the surface and underlying features, characterised in that (a) the apparatus is operated over a bandwidth of at least 8 GHz; and (b) part of the scanning means in use is maintained at a fixed position relative to a surface of interest and the position signal is determined as a function of the instantaneous position of the transceiver relative to the said fixed position.

21. A method according to claim 20 wherein said mechanical scanning is performed across the surface in two dimensions.

22. A method according to claim 20 wherein said scanning is effected by driving a scissor linkage on which said transceiver is mounted.

23. A method according to claim 22 including the step of adjusting the number of arms of said scissor linkage for altering the area of said surface which is scanned.

24. A method according to claim 22 wherein said scissor linkage is driven by controlling an X-Y scanner operatively coupled thereto.

25. A method according to claim 24 wherein said X-Y scanner is controlled by a computer.

26. A method according to claim 25 wherein said providing a signal indicative of the instantaneous position of the transceiver effected by said computer.

27. A method according to claim 20 wherein said step of analysing includes deriving from said receive antenna signal separate phase quadrature amplitude signals I, Q.

28. A method according to claim 27 wherein said step of analysing includes signal transforming each of said signals I, Q into the time domain.

29. A method according to claim 27 wherein said combining step includes correlating said signals I, Q from the signal analysing means with voxel locations and said position signal for determining respective pairs of voxel I, Q signal amplitudes for each said voxel.

30. A method according to claim 29 wherein for each voxel the respective voxel I, Q signal amplitudes are squared, and added and the resulting sum is square rooted to provide a voxel total amplitude signal.

31. A method according to claim 29 wherein said voxel I, Q signal amplitudes for all the voxels are interpolated over a finer resolution array of voxels, each voxel of said finer array thereby having separate interpolated I, Q signal amplitudes.

32. A method according to claim 31 wherein for each voxel of said finer array the respective interpolated voxel I, Q signal amplitudes are squared, and added and the resulting sum is square rooted to provide a voxel total amplitude signal.

33. A method according to claim 30 wherein the array of voxel total amplitude signals provides said radar image signal.

34. A method according to claim 20 and including the step of displaying said radar image signal.

35. A method according to claim 20 wherein a single receive antenna is provided.

36. A method according to claim 20 wherein said bandwidth is centred within the range 8 to 16 GHz.

* * * * *